Oct. 12, 1937.　　　E. G. WATKINS ET AL　　　2,095,683
TIME STAMP
Filed Oct. 10, 1932　　　6 Sheets-Sheet 1
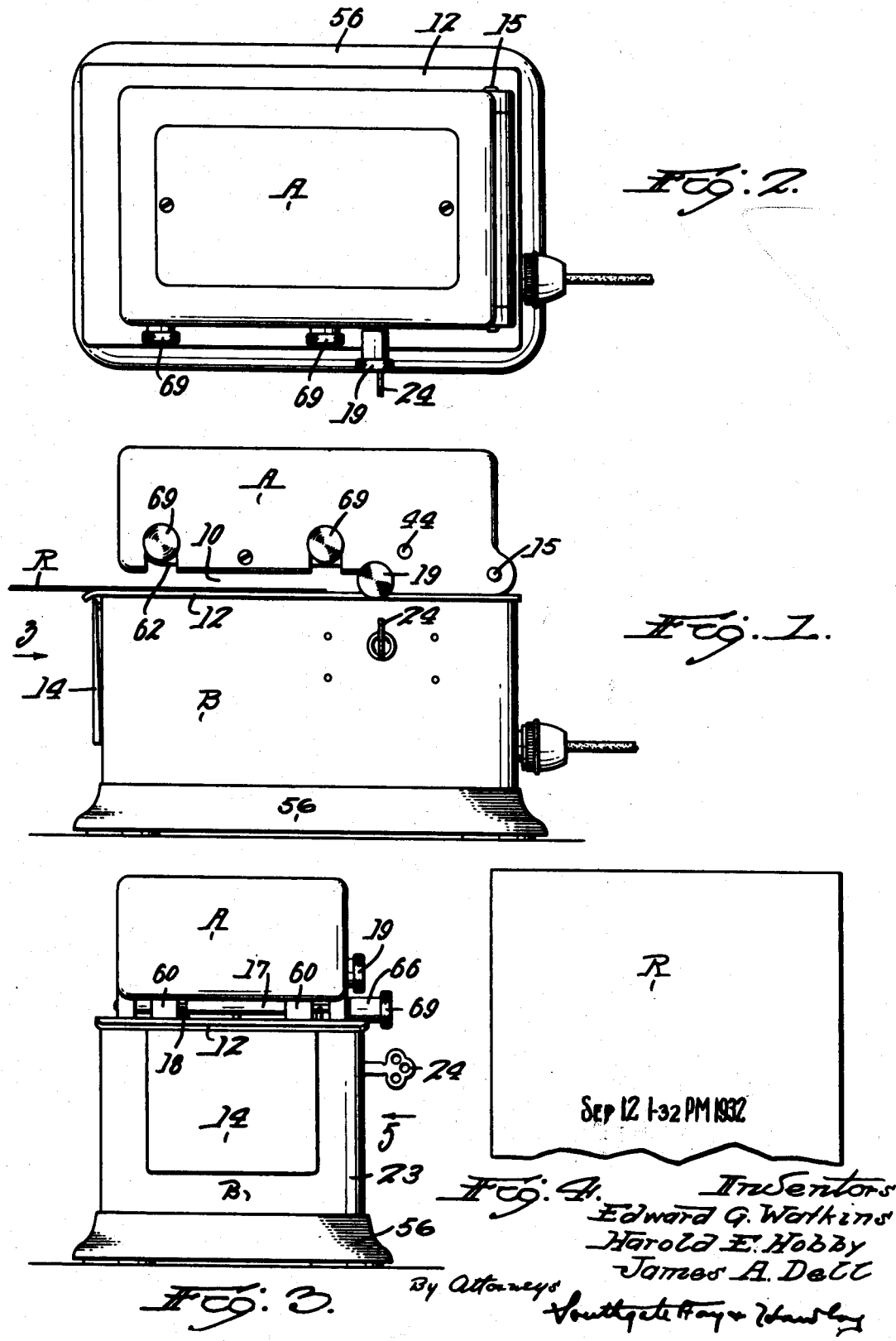

Oct. 12, 1937.  E. G. WATKINS ET AL  2,095,683
TIME STAMP
Filed Oct. 10, 1932  6 Sheets-Sheet 2

Inventors
Edward G. Watkins
Harold E. Hobby
James A. Dett
By Attorneys

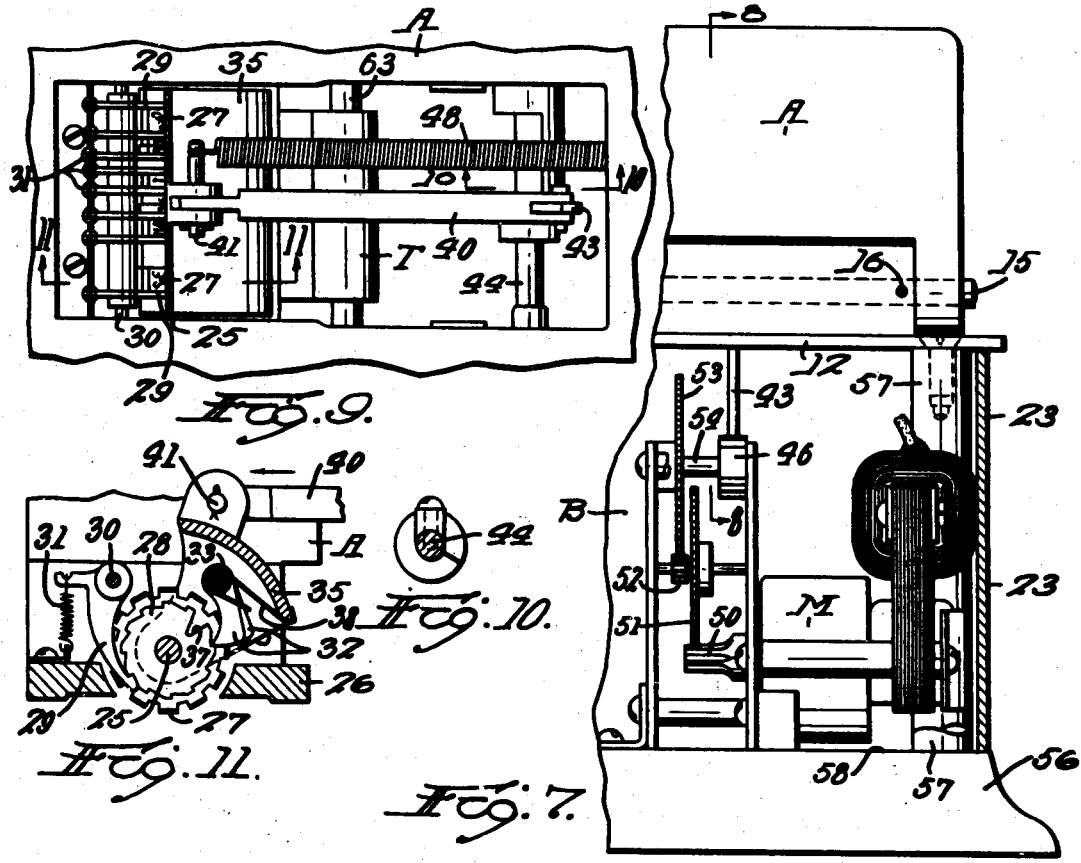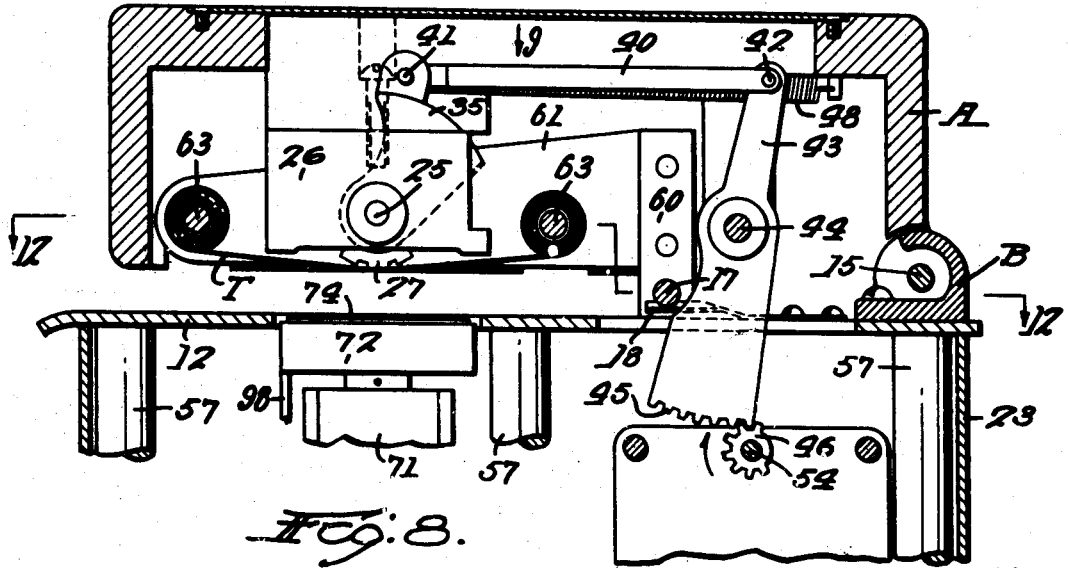

Oct. 12, 1937. E. G. WATKINS ET AL 2,095,683
TIME STAMP
Filed Oct. 10, 1932 6 Sheets-Sheet 4
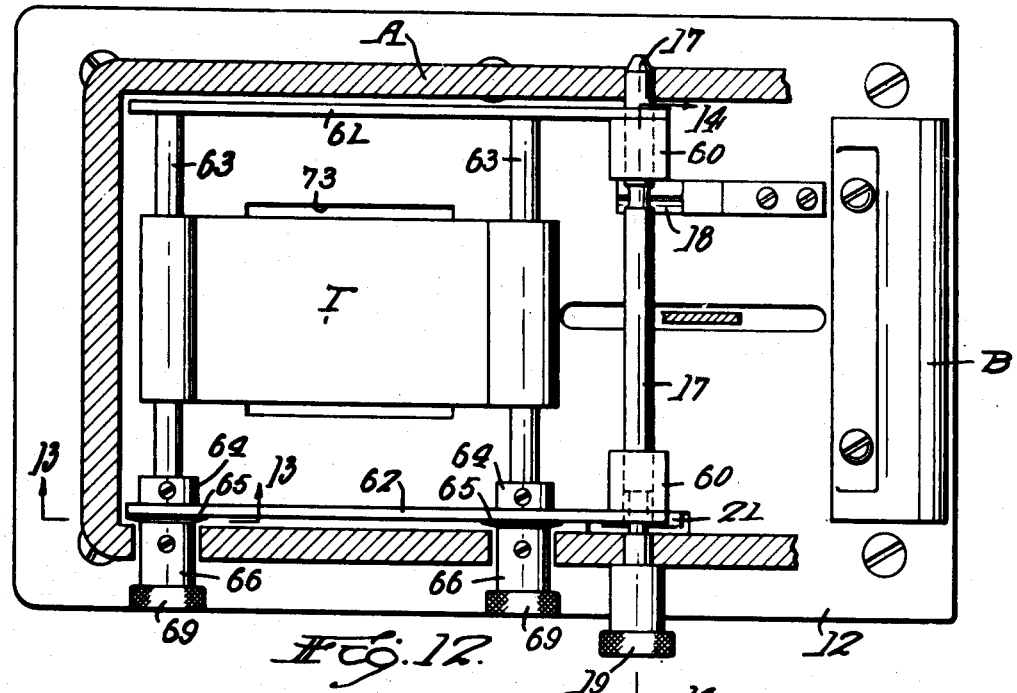
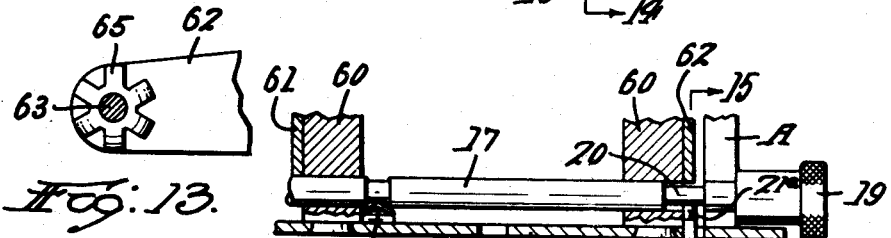
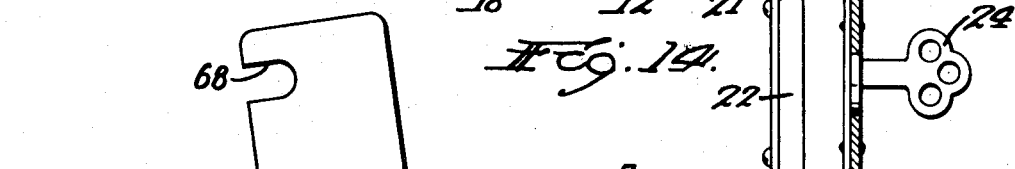
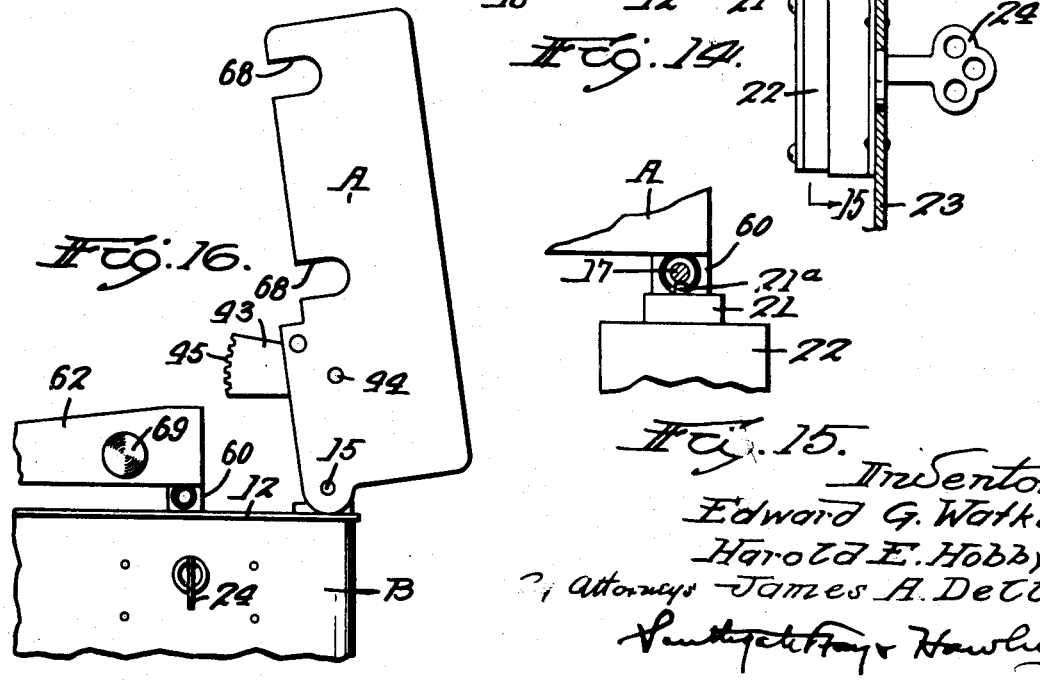

Oct. 12, 1937. E. G. WATKINS ET AL 2,095,683

TIME STAMP

Filed Oct. 10, 1932   6 Sheets—Sheet 5

Inventors
Edward G. Watkins
Harold E. Hobby
James A. DeCC
By Attorneys

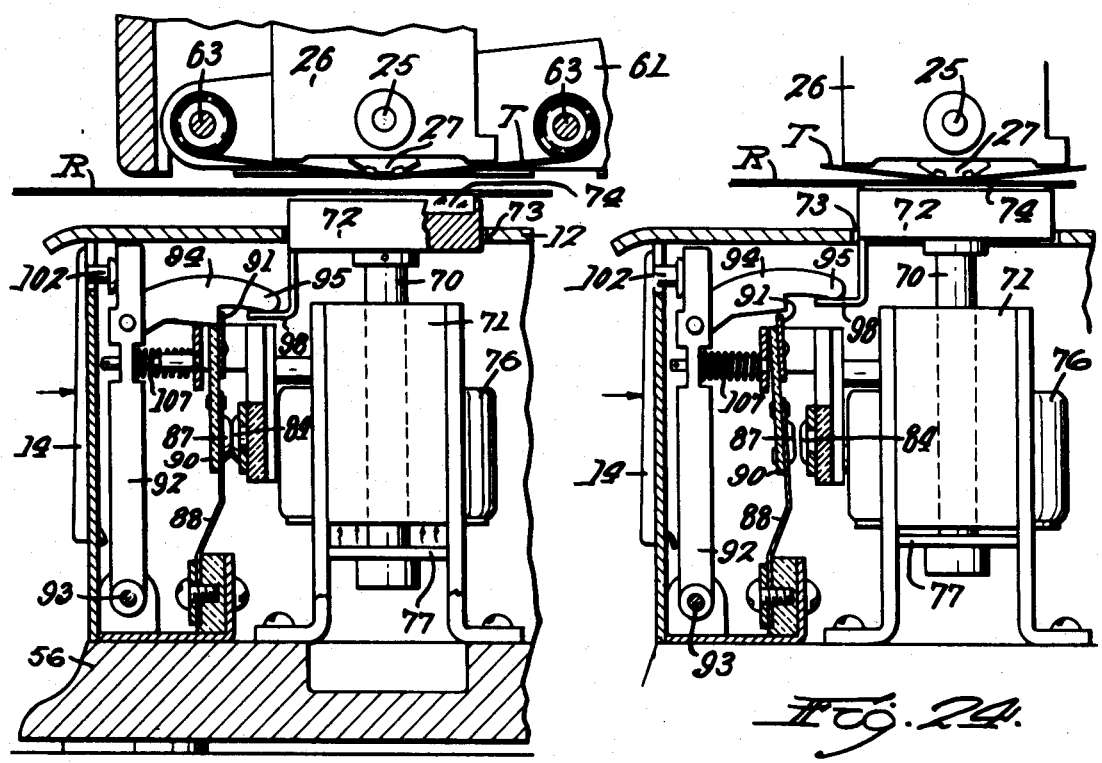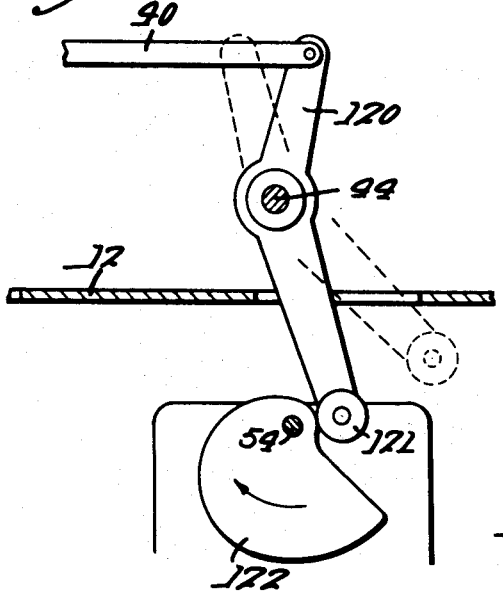

Patented Oct. 12, 1937

2,095,683

UNITED STATES PATENT OFFICE 2,095,683

TIME STAMP

Edward G. Watkins, Harold E. Hobby, and James A. Dell, Gardner, Mass., assignors to Simplex Time Recorder Company, Gardner, Mass., a corporation of Massachusetts Application October 10, 1932, Serial No. 637,082

3 Claims. (Cl. 234—53.5)

This invention relates to apparatus by which a printed time impression may be produced on a card, paper or other record. Our invention more specifically relates to time stamps in which the clock mechanism or the impression mechanism or both are electrically operated.

It is the general object of our invention to improve and simplify the construction of such time stamps, and to provide a stamp which is relatively low in manufacturing cost and exceedingly reliable in operation.

To the accomplishment of this object, our invention relates to certain arrangements and combinations of parts which will be hereinafter described and more particularly pointed out in the appended claims.

A preferred form of the invention is shown in the drawings, in which

Fig. 1 is a side elevation of our improved time stamp;

Fig. 2 is a plan view thereof;

Fig. 3 is an end view thereof;

Fig. 4 shows a portion of a card bearing a time stamp impression;

Fig. 7 is a rear elevation of certain electrical driving mechanism for the type wheels;

Fig. 8 is a sectional side elevation of the upper part of the time stamp, taken along the line 8—8 in Fig. 7;

Fig. 9 is a detail plan view, looking in the direction of the arrow 9 in Fig. 8;

Figure 5:
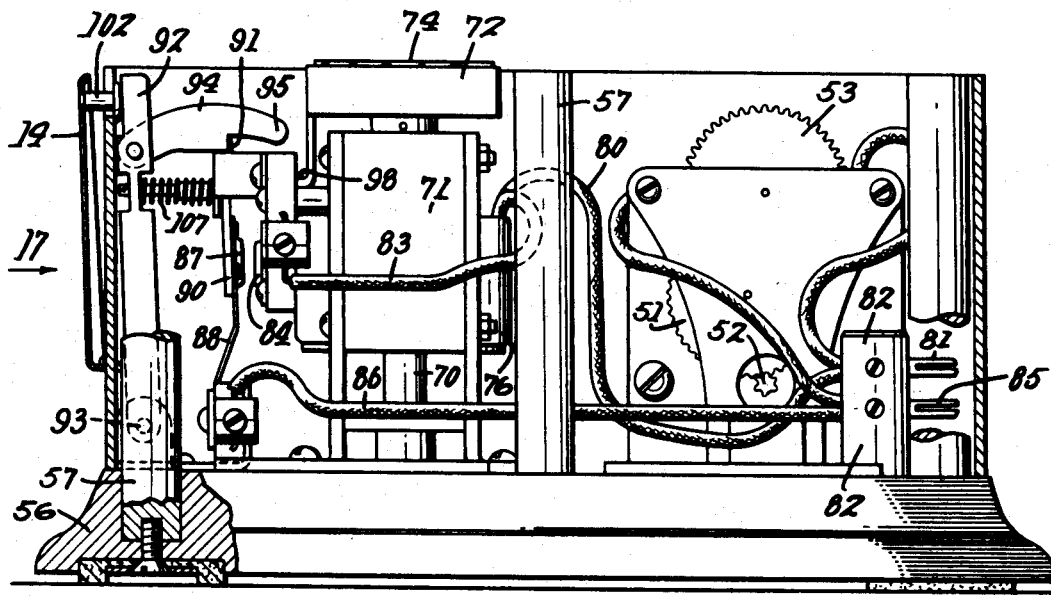
Fig. 5 is a side elevation of the lower portion of the time stamp, with the casing and a portion of the base in section.
Figure 17:
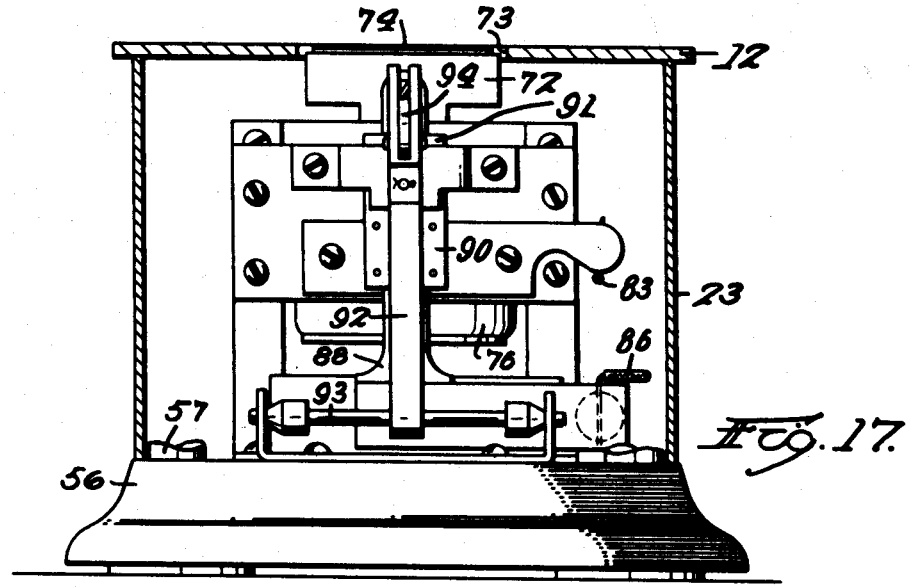
Figures 18, 19, 22:
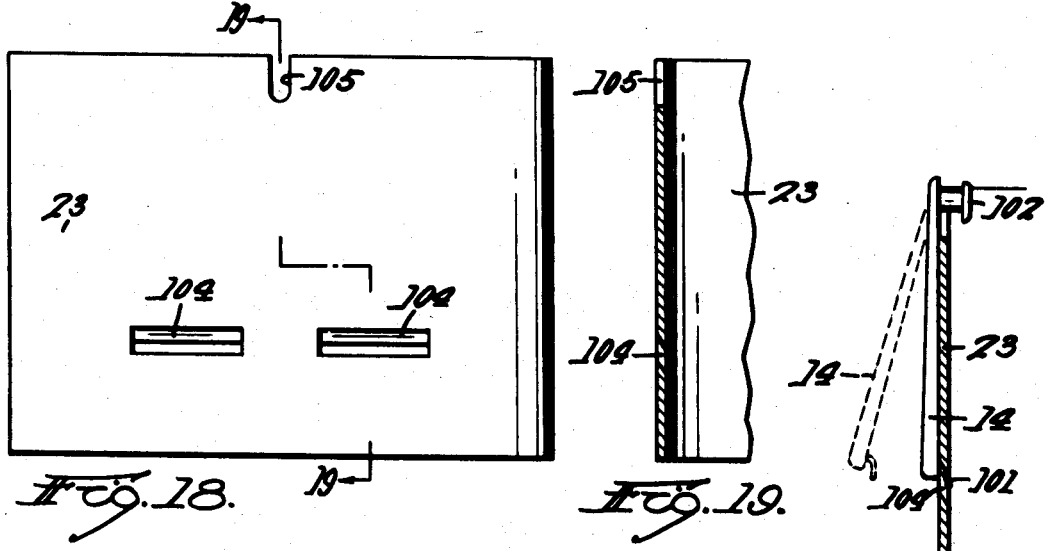
Figures 20, 21:
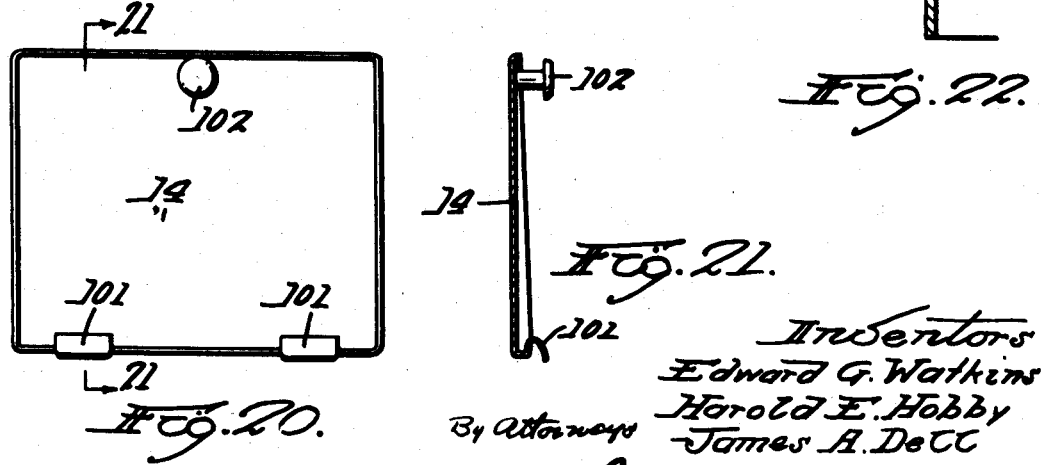

Figs. 10 and 11 are detail sectional views, taken along the lines 10—10 and 11—11 in Fig. 9;

Fig. 12 is a sectional plan view showing the ribbon mechanism and taken along the line 12—12 in Fig. 8;

Figs. 13 and 14 are detail sectional views, taken along the lines 13—13 and 14—14 in Fig. 12;

Fig. 15 is a detail sectional view, taken along the line 15—15 in Fig. 14;

Fig. 16 is a partial side elevation of the time stamp, with the upper portion of the stamp unlocked and raised;

Fig. 17 is an end view of the impression mechanism, looking in the direction of the arrow 17 in Fig. 5, and with the casing shown in section;

Fig. 18 is an end view of the removable casing for the lower port of the time stamp;

Fig. 19 is a detail sectional view of the casing, taken along the line 19—19 in Fig. 18;

Fig. 20 is a front elevation of the circuit-closing or impression plate;

Fig. 21 is a detail sectional view, taken along the line 21—21 in Fig. 20;

Fig. 22 illustrates the assembly of the impression plate with the time stamp casing;

Fig. 23 is an enlarged sectional side elevation of the impression mechanism and circuit-closing devices;

Fig. 24 is a view similar to Fig. 23 but with the parts in a different relative position, and Fig. 25 is a partial sectional side elevation showing a modified type wheel drive.

Referring to the drawings, our improved time stamp is particularly designed for producing a printed record of the general style indicated in Fig. 4, for which purpose we provide type wheels as follows:— a month wheel, tens and unit day wheels, an hour wheel, tens and unit minute wheels, a meridian wheel and a year wheel. Any desired number of these type wheels may be arranged for automatic operation but in the simplest form of our machine we change the year, month and day wheels manually and the hour, minute and meridian wheels automatically.

For the purpose of producing the printed record shown in Fig. 4, we mount the type wheels in an upper portion A (Fig. 1) of the time stamp and we mount electric type wheel driving mechanism and electrical impression mechanism in the lower portion B of the time stamp.

The card or record R is inserted in a slot or opening 10 at the front of the machine and between the upper and lower parts A and B. The record rests upon the top or cover plate 12 of the lower portion B of the time stamp and an impression is produced by pushing the circuit-closing or impression plate 14 (Fig. 1) manually inward, thus causing electrically operated impression mechanism to move the record R forcibly upward against the type wheels.

Type wheel and ribbon mechanism

The type wheel and ribbon mechanism is mounted in the upper portion A of the time stamp, which portion A is pivoted to the lower portion B by a hinge-pin 15 (Figs. 7 and 8) loosely inserted through aligned openings in the parts A and B and held from displacement by a screw 16 (Fig. 7). The upper portion A is held in the operative position shown in Figs. 1 and 3 by a locking pin 17 (Figs. 12 and 14) insertable in aligned openings in parts carried by the upper and lower portions A and B and yieldingly held in locking position by a spring plate 18 (Figs. 8 and 14).

The locking pin 17 is provided with an enlarged head 19 (Fig. 14) by which it may be conveniently removed or replaced, and is also preferably provided with an annular groove or recess 20 adapted to receive a lug or projection 21ᵃ on the end of the bolt 21 of a lock 22 mounted on the inside of the casing 23 of the lower stamp portion B. A removable key 24 may be provided by which the pin 17 may be locked or released. When this lock and key are provided, it is impossible for an unauthorized person to raise the upper portion A of the time stamp or to obtain access to the printing wheels.

After the pin 17 is removed, the upper portion A may be swung upward to the position indicated in Fig. 16, in which position the manually operated type wheels may be conveniently set. In this position the automatic drive of the time and meridian wheels is also disconnected, so that these wheels also may be adjusted manually when resetting or correcting the time indication.

The type wheel mechanism is in general of an old and well-known construction and is indicated in some detail in Figs. 8, 9 and 11. A cross shaft 25 (Fig. 8) is mounted in bearings in a supporting member 26 secured to the frame of the upper time stamp portion A. A series of type wheels 27 (Fig. 11) are loosely mounted on the cross shaft 25 and are provided with ratchet wheels 28, each secured at the side of its associated type wheel.

Separate holding pawls 29 are mounted on a cross rod 30 and are provided with separate tension springs 31. These pawls 29 engage the associated ratchet wheels 28 and prevent rearward or accidental movement of the type wheels.

A series of feed pawls 32 are fixed to a cross rod 33 pivoted in a carrier 35, which carrier in turn is mounted to swing about the axis of the type wheel shaft 25. The pawls 32 are secured together in different relative angular positions and the pawl 32 for the minute unit wheel is ordinarily the only feed pawl which engages its associated ratchet wheel.

Once in each revolution of this type wheel, however, this pawl enters a relatively deep notch 37 (Fig. 11) in its ratchet wheel, thus allowing the minute tens feed pawl to engage its ratchet wheel. At the end of each hour, the minute tens pawl also enters a deep notch, allowing the hour wheel pawl to engage its ratchet wheel and advance the hour wheel. Once in each revolution of the hour wheel, the hour feed pawl also enters a deep notch, permitting the meridian feed pawl to become operative.

The feed pawls are collectively forced toward the ratchet wheels by a spring 38 (Fig. 11) and the carrier 35 for the feed pawls is given a rocking movement each minute through a link 40 pivoted at 41 to the carrier 35. The other end of the link 40 is pivoted at 42 (Fig. 8) to the upper end of a lever 43 mounted on a cross shaft 44 pivoted in bearings in the rear part of the upper portion A.

The lower end of the lever 43 is provided with segmental gear teeth as indicated at 45 (Fig. 8) which teeth are engaged by the teeth of a segmental pinion 46 which is continuously rotated by clock mechanism to be described.

By such continued rotation, the lever 43 receives a slow anti-clockwise movement, as viewed in Fig. 8, swinging the carrier 35 and pawls 32 to the left. Upon release of the lever 43 by the segmental pinion 46, a tension spring 48 (Fig. 9) gives the pawls 32 an abrupt feeding movement to the right.

When raising the upper time stamp portion A for setting or correction, it is always desirable to raise the portion A immediately after a feeding movement and while the segmental pinion 46 is disengaged, at the same time disconnecting the power from the electric clock movement, so that the pinion may remain unmoved until the lever 43 is again engaged.

Type wheel driving mechanism

In the preferred form of our invention, the type wheel driving mechanism preferably comprises a small electric motor M rotatable in definite timed relation to the generator by which the driving current is produced. The motor M continuously rotates a pinion 50 (Fig. 7) which engages a gear 51 having a pinion 52 associated therewith, said pinion engaging a gear 53 on the shaft 54 to which the segmental pinion 46 is secured.

The pinion 46 is thus given one complete rotation each and every minute and releases the lever 43 for a feeding movement of the type wheels at the end of each minute.

The type wheel driving mechanism above described is mounted in the lower portion B of the time stamp and is rigidly supported on a base 56, preferably in the form of a relatively heavy casting. A plurality of posts 57 project upward from the base 56 and firmly support the top plate 12 previously described.

The casing 23, preferably forms a continuous enclosure around the posts 57 and is held from lateral displacement thereby but is freely removable upwardly after the cover plate 12 is removed, thus giving access to the mechanism enclosed thereby. The lower edge of the casing 23 rests on a shoulder 58 (Fig. 7) of the base 56, and the upper edge of the casing 23 engages the under side of the cover plate 12.

Ribbon mechanism

A ribbon mechanism for the type wheels 27 is mounted on the cover plate 12 of the time stamp and is shown in detail in Figs. 8 and 12. Posts 60 project upward from the cover plate 12 and are provided with laterally projecting offset arms 61 and 62, which arms provide bearings for a pair of ribbon shafts 63 for a ribbon T.

Collars 64 on the shafts 63 engage the inner surface of the arm 62, and friction or spring washers 65 (Fig. 13) engage the outer surface thereof and are held under compression by caps or heads 66 on the outer ends of the shafts 63. These caps or heads 66 project outward through recesses 68 (Fig. 16) in the frame of the upper time stamp portion and are provided with knurled heads 69 by which the ribbon shafts may be turned and the ribbon T manually adjusted.

If automatic feed of the ribbon after each impression is desired, any suitable automatic feeding mechanism may be provided.

Impression mechanism

The means for making the impression on the record R is clearly shown in Figs. 17, 23 and 24 and comprises a plunger 70 slidable in a vertical bearing in a magnet core 71. A head 72, preferably of non-magnetic material, is mounted at the upper end of the plunger 70 and is slidable vertically through an opening 73 in the cover plate 12.

A pad 74 of cork or other suitable cushion material is mounted in the upper face of the head 72 in position to engage the under side of the record R and to force the record, together with the type wheel ribbon T, vertically upward against the operatively positioned type wheels 27, thus making a printed record as indicated in Fig. 4.

The magnet core 71 is provided with a coil 76 by which the magnet is energized and the plunger 70 is provided at its lower end with a plate 77 of magnetic material which is strongly attracted and quickly drawn upward when the magnet coil 76 is energized, thus moving the head 72 from the position shown in 23 to the stamping position shown in Fig. 24.

Figure 6:
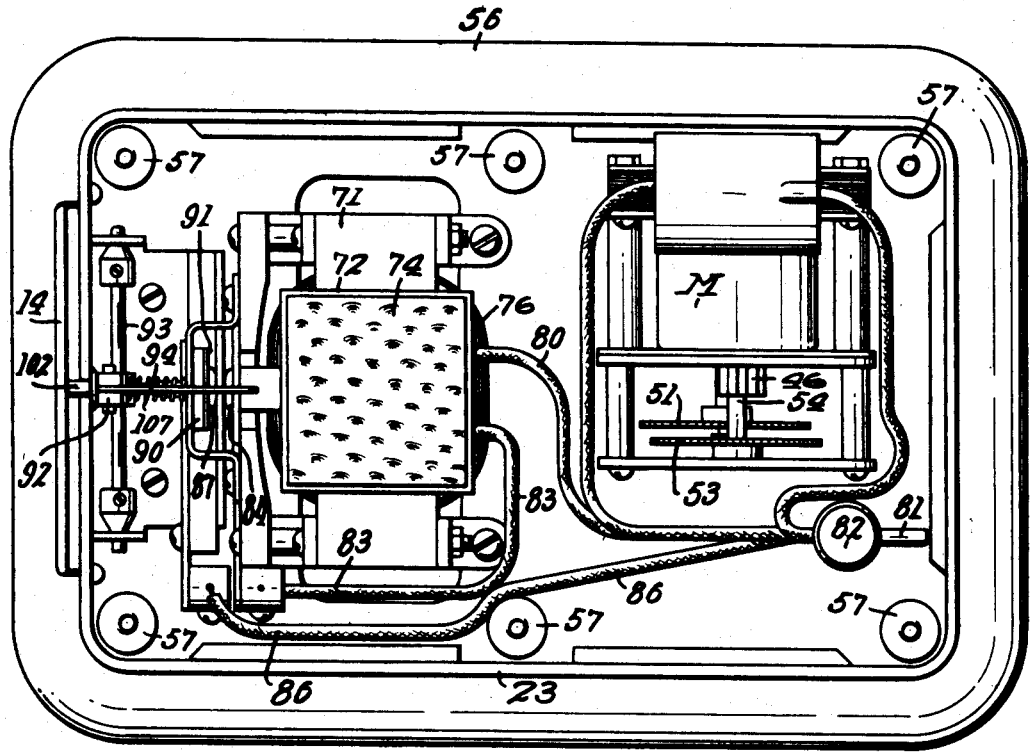
Fig. 6 is a plan view of the parts shown in Fig. 5.

One terminal 80 (Figs. 5 and 6) of the magnet coil 76 is connected to an upper terminal 81 in a terminal post 82 at the rear of the machine and the other end of the coil 76 is connected by a wire 83 to a contact plate 84 near the front end of the machine. A second terminal 85 in the post 82 is connected by a wire 86 to a contact plate 87 supported on a spring plate 88 (Fig. 23). The spring plate 88 also carries a plate 90 of non-conducting material, from the upper edge of which a lug 91 (Figs. 23 and 24) projects.

An impression lever 92 (Fig. 23) is pivoted at 93 on the base 56 and is provided with a pivoted latch 94 having a shoulder adapted to engage the lug 91. The latch 94 also has a rearwardly projecting portion 95 resting on an offset projection 98 extending downward from the impression head 72.

The impression plate 14 (Figs. 20 and 21) is provided with hooks 101 at its lower edge and with a headed stud 102 at its upper edge. The casing 23 (Figs. 18 and 19) has a pair of downwardly and inwardly extending slots 104 to receive the hooks 101 and has an additional notch or recess 105 to receive the stud 102.

The manner of assembling the plate 14 with the casing 23 is clearly indicated in Fig. 22. When thus assembled, the stud 102 (Fig. 23) engages the upper end of the impression lever 92 and when pushed rearward, causes the latch 94 to move the terminal or contact plate 87 rearward to engage the fixed contact member 84 and thus complete the circuit through the magnet coil 76.

A coil spring 107 normally separates the contact members and moves the impression plate 14 to its normal outward position. As the impression head 72 moves upward, the offset projection 98 acts through the latch extension 95 to raise the latch and release the lug 91, whereupon the spring plate 88 separates the contact members 84 and 87, thus breaking the magnetic circuit.

Consequently, a single momentary impression only is made for each actuation of the plate 14, and it is impossible to hold the record sheet in raised position against the type wheels 27 except for the very brief impression interval.

In Fig. 25 we have shown a modified type wheel drive in which the link 40 previously described is pivoted to a cam lever 120 mounted on the cross shaft 44 previously described and having a cam roll 121 at its lower end engaging a scroll cam 122 mounted on the shaft 54 of the type wheel driving mechanism and preferably rotated once each minute. The operation is substantially the same as that of the intermittent pinion but there is less necessity to secure a particular relation of the parts before the portion A is swung upward.

Operation

Having described the details of construction of our improved time stamp, it will be observed that the device is simple in construction and possesses few moving parts, which parts are so designed that they will be entirely reliable in continued operation.

In order to place the stamp in operation, the portion A is swung upward and the type wheels are set manually to the desired day and time. The portion A is then swung downward and locked in position and the type wheel driving mechanism will maintain the type wheels in the desired time relation except for manual setting of the date wheels in cases where automatic date change is not provided.

When a record is to be made, the card or record sheet R is inserted in the opening 10 (Fig. 1) and the operator pushes inward on the impression plate 14, thus closing the circuit through the magnet coil 76 and causing the impression head 72 to move quickly upward, stamping the record sheet against the ribbon T and type wheels 27, thus making the desired record.

Further details of operation have been fully described in connection with the description of the mechanism and a further statement of operation is believed unnecessary.

Having thus described our invention and the advantages thereof, we do not wish to be limited to the details herein disclosed, otherwise than as set forth in the claims, but what we claim is:—

1. A time stamp comprising a lower portion, an upper portion pivotally connected thereto, means to secure said portions in fixed relation to each other, a plurality of type wheels in said upper portion accessible only from beneath, driving mechanism therefor in said lower portion, a separable driving connection between said driving mechanism and said type wheels comprising a toothed lever mounted in said upper portion, an actuating device operated by said lever and effective to intermittently advance said type wheels, a continuously rotated segmental pinion mounted in said lower portion and engaging said lever, and yielding means to return said lever to initial position when disengaged from said pinion by continued rotation thereof.

2. A time stamp comprising upper and lower portions, a plurality of type wheels mounted in said upper portion and accessible only from beneath, driving mechanism for said type wheels mounted in said lower portion and comprising a segmental pinion, means to continuously rotate said pinion, a toothed lever mounted in said upper portion, an actuating device operated by said lever and effective to intermittently advance said type wheels, and yielding means to return said lever to initial position when disengaged from said pinion by continued rotation thereof.

3. In a time stamp, comprising upper and lower portions, wherein the upper portion includes printing mechanism, and the lower portion includes impression mechanism adapted to cooperate with the printing mechanism, and electrically controlled operating means for said impression mechanism, including a circuit maker and breaker; the improvement which comprises a removable enclosing casing for the mechanism in said lower portion, and a plate carried by said casing and manually movable to actuate said circuit maker and breaker, said plate being freely removable and replaceable with said casing from said lower time stamp portion.

EDWARD G. WATKINS.
HAROLD E. HOBBY.
JAMES A. DELL.